United States Patent [19]

Washizu et al.

[11] Patent Number: 5,018,485
[45] Date of Patent: May 28, 1991

[54] INTAKE SYSTEM FOR AUTOMATIVE ENGINE

[75] Inventors: Takehiro Washizu; Tsutomu Nagamatsu, both of Iwata, Japan

[73] Assignee: Yamaha Hatsudoki Kabushiki Kaisha, Iwata, Japan

[21] Appl. No.: 485,466

[22] Filed: Feb. 27, 1990

[30] Foreign Application Priority Data

Mar. 3, 1989 [JP] Japan .................................. 1-51612

[51] Int. Cl.⁵ .......................................... F02M 35/10
[52] U.S. Cl. ............................................... 123/52 MB
[58] Field of Search ........ 123/52 M, 52 MV, 52 MC, 123/52 MF, 52 ML, 52 MB

[56] References Cited

U.S. PATENT DOCUMENTS 4,615,324 10/1986 Choushi et al. ............... 123/52 MV
4,765,285  8/1988 Kobayashi ..................... 123/52 MB
4,821,684  4/1989 Tasaka ........................... 123/52 MV

FOREIGN PATENT DOCUMENTS 0280822 11/1988 Japan ............................... 123/52 M Primary Examiner—David A. Okonsky
Attorney, Agent, or Firm—Ernest A. Beutler

[57] ABSTRACT

An improved induction system for an internal combustion engine that improves power throughout the entire speed and load ranges by including two plenum chambers, having separate intake passage that serve the cylinders of the engine. One plenum chamber and its intake passages is designed to improve low and midrange performance while the other plenum chamber and its intake passage is tuned for high speed performance. An atmospheric air inlet is provided only for the latter plenum chamber and the first mentioned plenum chamber receives its atmospheric air from this plenum chamber through a connecting passageway.

12 Claims, 3 Drawing Sheets

INTAKE SYSTEM FOR AUTOMATIVE ENGINE

BACKGROUND OF THE INVENTION

This invention relates to an induction system for an internal combustion engine and more particularly to an induction system for an internal combustion engine that improves the performance throughout the entire speed and load ranges of the engine.

It has been well known that the power output of an internal combustion engine and its performance is dependent upon the induction system of the engine. Conventionally, engine induction systems are tuned so as to represent a compromise between high speed performance and low speed performance. Recently, however, it has been proposed to employ a form of variable induction system wherein the induction system can be tuned so as to improve the performance through a wider range of the engine's running condition. One way in which this is done is to provide a pair of plenum chambers, each of which serves the engine induction system through respective manifold runners and the plenum chambers and runners are tuned so as to serve different running conditions of the engine.

With such arrangements, it has been the common practice to provide throttle valves between one of the plenum chambers and its induction passages and also to have a common portion for the induction passages of both systems. Such arrangements reduce the complexity and cost of the engine. With this type of arrangement, it has heretofore been the practice to provide the atmospheric air inlet and throttle valve for the engine at the plenum chamber that serves the low speed and midrange running conditions of the engine. The plenum chamber for the high speed running receives its atmospheric air through the same inlet and through the manifold induction passages.

This has some disadvantages. Primarily, the fact that the atmospheric air for the high speed plenum chamber must flow from the low speed plenum chamber, there is some flow resistance and some reduction of maximum power output. Also, the positioning of the throttle valves in certain prior art arrangements is such that the throttle valves restrict the flow of air through the induction system and, accordingly, reduce the power output of the engine.

It is, therefore, a principal object of this invention to provide an improved intake system for an internal combustion engine.

It is a further object of this invention to provide an induction system for an internal combustion engine that can improve the performance throughout the entire engine load and speed ranges and which will be relatively simple in construction and cost.

It is a further object of this invention to provide a variable induction system for an internal combustion engine wherein maximum power can be achieved without any losses in low range performance.

SUMMARY OF THE INVENTION

This invention is adapted be embodied in an induction system for an internal combustion engine having a combustion chamber. A first plenum chamber and first intake passage means supply a charge to the combustion chamber. A second plenum chamber is spaced from the first plenum chamber and second intake passage means communicate the second plenum chamber with the combustion chamber. The first intake passage means and first plenum chamber are tuned to serve the low speed running condition of the engine and the second plenum chamber and second intake passage means are tuned to improve the high speed running condition of the engine.

An atmospheric air inlet is provided only for the second plenum chamber and throttle valve means control the communication of the second plenum chamber with the combustion chamber. Conduit means communicates the second plenum chamber with the first plenum chamber for providing the sole source of atmospheric air from the atmospheric air inlet for the first plenum chamber.

DETAILED DESCRIPTION OF THE PREFERRED EMBODIMENT OF THE INVENTION

Figure 1:
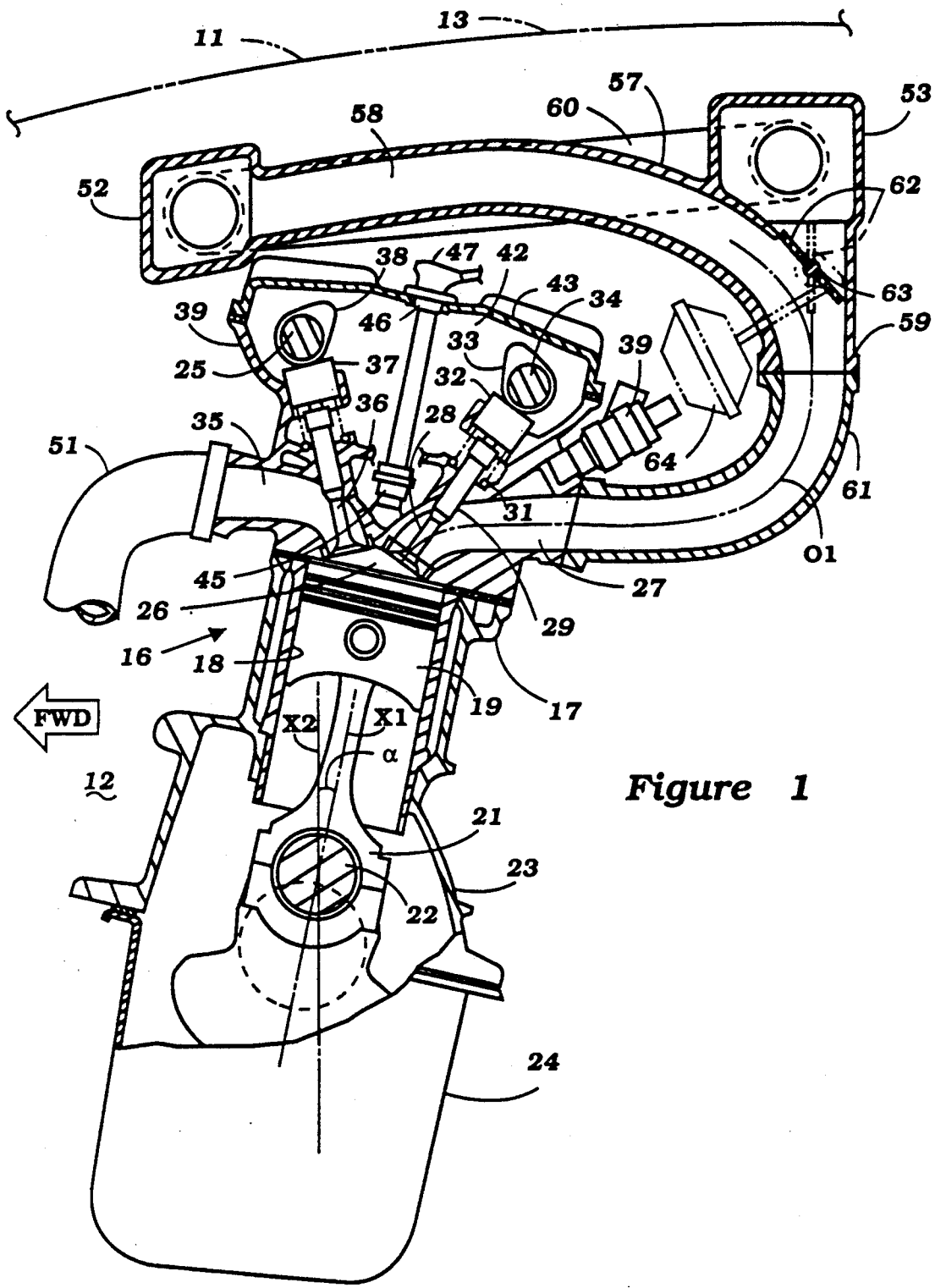
FIG. 1 is a side elevational view of an internal combustion engine constructed in accordance with an embodiment of the invention, with portions broken away and shown in section, and indicating the orientation of the engine in the engine compartment of an associated motor vehicle, which is shown in phantom.
Figure 2:
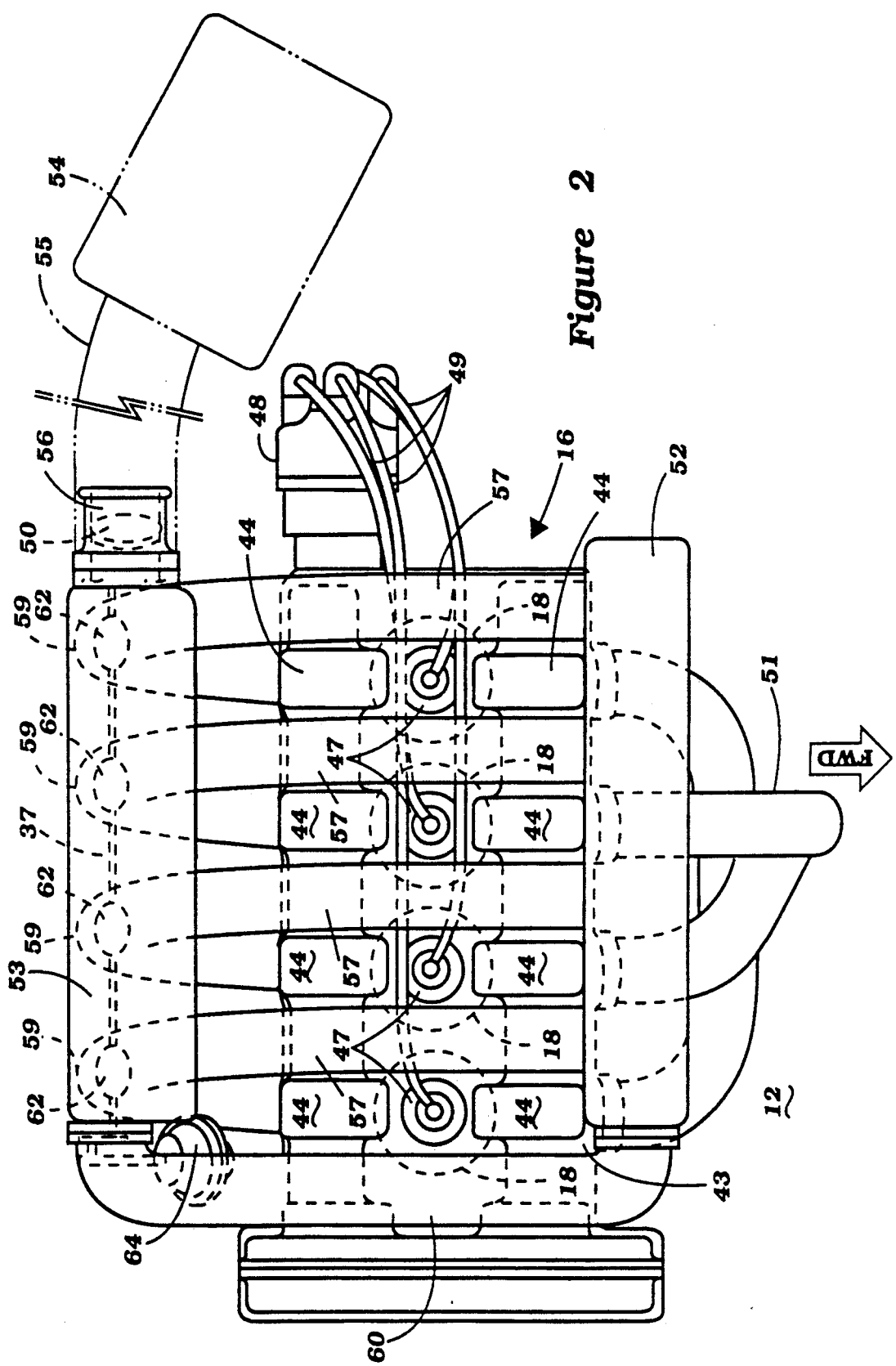
FIG. 2 is a top plan view of the engine.

Referring first to the embodiment FIGS. 1 and 2, a motor vehicle powered by an internal combustion engine having an induction system constructed in accordance with this embodiment of the invention is shown in phantom identified generally by the reference numeral 11. Only the forward portion of the vehicle 11 is shown and specifically the engine compartment 12 that is defined by a pair of fender aprons and a front grille opening behind which a cooling radiator is positioned. The engine compartment is closed by a hood 13 which is also shown in phantom.

An internal combustion engine, constructed in accordance with an embodiment of the invention is identified generally by the reference numeral 16 and, in the illustrated embodiment, comprises a four cylinder in line engine that is positioned transversely across the engine compartment 12. The engine 16 drives the front wheels (not shown) of the vehicle 11 through a suitable transmission and differential mechanism as is well known in this art.

The engine 16, as has been previously noted, is of the four cylinder in line type. To this end, a cylinder block 17 is provided with four aligned cylinder bores 18 in which pistons 19 reciprocate. The pistons 19 are connected by means of connecting rods 21 to individual throws of a crankshaft 22 for driving the crankshaft as is well known. The crankshaft 22 is journaled for rotation within a crankcase chamber defined by a skirt 23 of the cylinder block 17 to which a crankcase or oil pan 24 is affixed in a known manner.

A cylinder head assembly 25 is affixed to the cylinder block 17 in a known manner and has individual combustion chamber recesses 26 that cooperate with the cylinder bores 18 and pistons 19 to form the combustion chambers of the engine. A plurality of intake ports 27, in the illustrated embodiment, one for each combustion chamber 26, extend through the rear face of the cylinder head 25 and terminate at the combustion chambers 26. Poppet type intake valves 28 are slidably supported by guides 29 in the cylinder head 25 and are urged toward their closed positions by means of coil compression springs 31. Thimble tappets 32 are slidably supported in the cylinder head assembly 25 and are operated by the lobes 33 of an intake camshaft 34. The camshaft 34 is journaled for rotation in the cylinder head assembly 25 in a known manner.

Exhaust ports 35 extend through the cylinder head assembly 25 from the combustion chambers 26 to the forward side of the cylinder head assembly 25. As a result, a cross flow cylinder head assembly is provided. Exhaust valves 36 control the opening and closing of the exhaust ports 35 and are urged toward their closed position by coil compression springs 40. Tappet assemblies 37 are slidably supported in the cylinder head assembly 25 and are operated by the lobes 38 of an exhaust camshaft 39. The exhaust camshaft 39 is journaled for rotation in a known manner.

In the illustrated embodiment, there are provided four valves per cylinder. That is, there are two intake valves 28 for each cylinder and two exhaust valves 36 for each cylinder. However, the intake ports 27 and the exhaust ports 35 are siamese. That is, the intake and exhaust ports 27 and 35 each emanate from a single passageway formed in the respective intake and exhaust side of the cylinder head assembly 25 and then diverge to the individual seats associated with the intake and exhaust valves 28 and 36. Of course, the invention can be utilized in conjunction with engines having different numbers of valves per cylinder.

The valve train as thus far described is contained within a cavity or valve chamber 42 that is formed at the top of the cylinder head assembly 25 and which is closed by a cam cover 43 that is affixed to the cylinder head assembly 25 in a known manner. The cam cover 43 is provided with protrusions 44 adjacent the bearing caps for the camshafts 34 and 39 which protrusions overlie the bearing caps so as to provide a clearance area.

Spark plugs 45 are mounted in the cylinder head assembly 25 and are accessible through openings 46 in the cam cover 43. Respective terminals 47 are affixed to the tips of the spark plug and are fired from a distributor 48 that is located at one end of the engine and which may be driven from the intake camshaft 34 in a suitable manner. Spark leads 49 extend from this distributor 48 to the individual spark plug terminals 47.

An exhaust manifold 51 is affixed to the exhaust or forward side of the cylinder head assembly 25 and conveys the exhaust gases to the atmosphere through an appropriate exhaust system (not shown).

The engine 16 is also supplied with an induction system for delivering a fuel/air charge to the individual intake ports 27 of the cylinder head assembly 25 for delivery to the combustion chambers 26. This induction system includes a first plenum chamber 52 that extends generally along the length of the engine over the exhaust manifold 51 on the exhaust side of the cylinder head assembly 25. There is further provided a second plenum chamber 53 which also extends along the length of the engine 16 but which is positioned on the intake side of the cylinder head assembly 25.

As will be described, the plenum chamber 52 and the runners associated with it are designed so as to primarily improve low and midrange performance. The plenum chamber 53, on the other hand, is designed so as to improve high speed performance.

Air is delivered from the atmosphere to the plenum chamber 53 from an air cleaner silencer assembly 54. A short connecting pipe 55 connects the intake device 54 with a throttle body 56 in which a manually operated throttle valve 50 is positioned for controlling the speed of the engine. Air from the plenum chamber 53 is delivered to the plenum chamber 52 through a connecting pipe 60 which lies at the opposite end of the plenum chamber 53 from the throttle body 56.

A plurality of generally horizontally extending runner pipes 57, one for each cylinder, extend transversely across the cylinder head assembly 25 from the plenum chamber 52 toward the plenum chamber 53. These runners 57 define individual passageways 58 that will supply air from the induction system as thus far described and specifically from the plenum chamber 52 to the individual cylinders of the engine. These runners extend through recesses formed in the cam cover assembly 43 between the protuberances 44 and specifically at locations that are spaced from the spark plugs 45.

As may be best seen in FIG. 1, the runners 57 have a reentrantly curved portion 59 which merges into a manifold section 61 that is attached to the cylinder head and which communicates with its intake ports 27. As a result of this configuration, there is a relatively long intake path provided from the plenum chamber 52 through the runners 57, their portions 59 and the manifold 61 which can be tuned to provide good induction efficiency at low and medium speeds.

The plenum chamber 53 also communicates with the reentrant sections 59 and manifold 61. However, a throttle valve assembly comprised of a plurality of individual throttle valves 62 supported on a throttle valve shaft 63 controls the direct communication of the plenum chamber 53 with the intake ports 27. A suitable load responsive device such as a vacuum motor 64 controls the opening and closing of the control valves 62. The operation is such that the valves 62 are maintained in a closed position at low and midrange performance and are opened at high speed. The length of the passages downstream of the valve 62 that communicate the plenum chamber 53 with the combustion chambers 26 is tuned so as to provide good high speed performance. As a result, the described induction system provides good performance under all running conditions and high output can be achieved without sacrificing midrange or low speed performance.

It will be noted that when the throttle valves 62 are in their closed position, atmospheric air flows from the throttle body 56 through the plenum chamber 53 to the connecting passageway 60 and then into the plenum chamber 52. This is different from prior art constructions wherein the atmospheric air is delivered directly to the plenum chamber 52. This long path presents no problems because of the fact that the air requirements at low and mid speeds, those served by the induction system including the plenum chamber 52, is relatively low. However, when the throttle valves 62 are opened, then the plenum chamber 53 is served by a relatively short induction system and good breathing capability will be achieved. In addition, some air may even be supplied to the plenum chamber 53 from the plenum chamber 52 and runners 57 of those cylinders which are not undergoing an intake cycle. Thus, further improvements in performance can be achieved than from prior art constructions.

Figure 3:
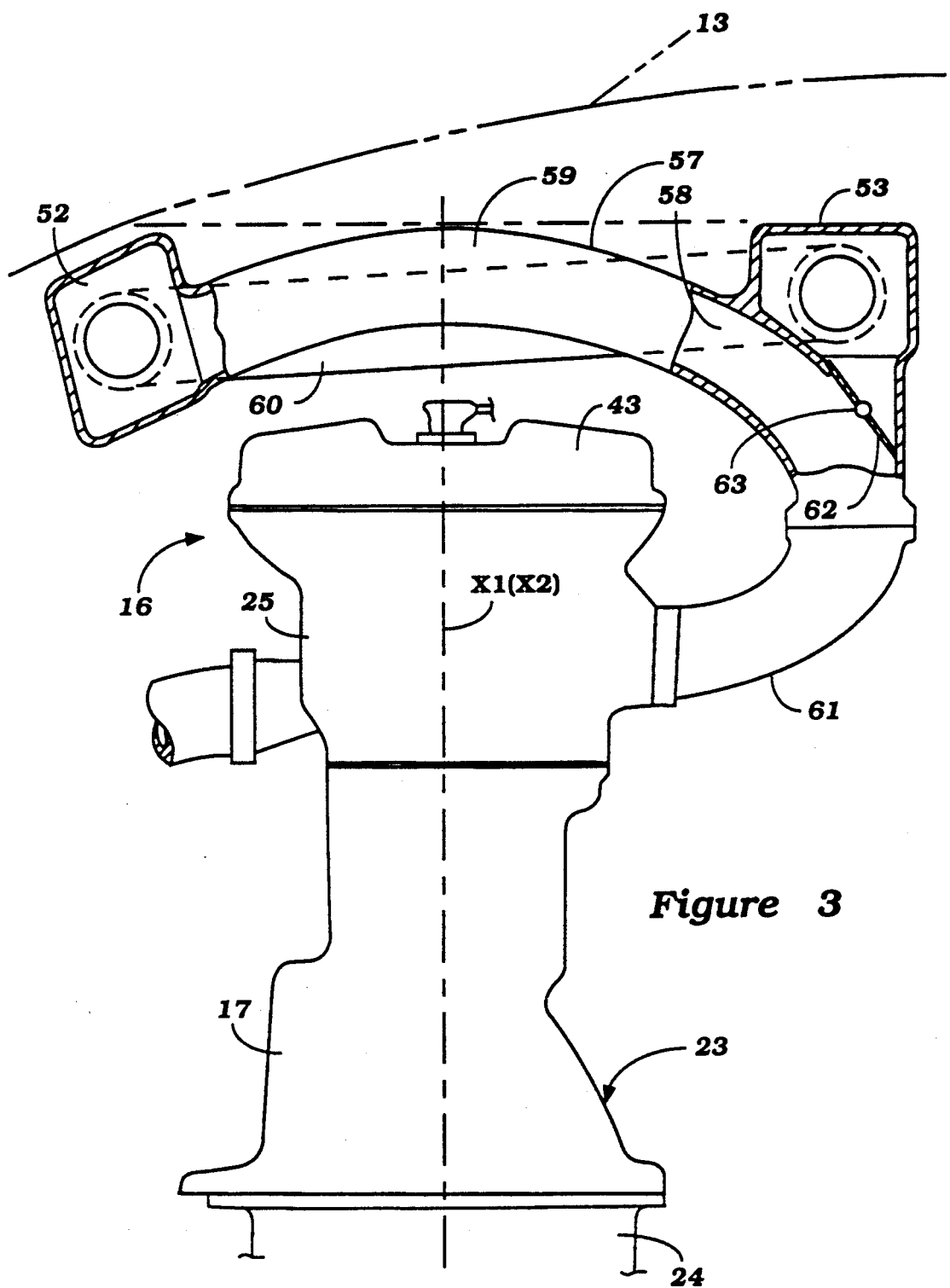
FIG. 3 is an end elevational view of an engine constructed in accordance with another embodiment of the invention, in part similar to FIG. 1, with portions broken away and shown in section.

In order to provide a lower hood line as shown in FIG. 1, the engine and specifically the cylinder block 17 is canted rearwardly so that the cylinder bore axis X1 is disposed at an angle α to a vertical plane X2. However, the invention can be equally as well practiced with engines wherein the cylinder bore axis extends vertically and such an embodiment is shown in FIG. 3. Because this embodiment is otherwise the same as the embodiment already described, further description of it is not necessary and the components which are the same or substantially the same have been identified by the same reference numerals and further description is not believed to be required.

It should be readily apparent from the foregoing description that the described embodiments of induction systems provide good performance throughout the entire load and speed ranges without sacrificing wide open throttle performance. Although two embodiments have been illustrated, various changes and modifications may be made without departing from the spirit and scope of the invention, as defined by the appended claims.

We claim:

1. An induction system for an internal combustion engine having a combustion chamber, a first plenum chamber, first intake passage means communicating said first plenum chamber with said combustion chamber, a second plenum chamber spaced from said first plenum chamber, second intake passage means communicating said second plenum chamber with said combustion chamber, said first intake passage means and said first plenum chamber being tuned to improve low and mid-range performance of the engine, said second plenum chamber and said second intake passage means being tuned to improve the high speed running conditions of said engine, an atmospheric air inlet only to said second plenum chamber, throttle valve means for controlling the communication of said second plenum chamber with said combustion chamber, and conduit means communicating said second plenum chamber with said first plenum chamber for providing the sole source of atmospheric air from said atmospheric air inlet for said first plenum chamber.

2. An induction system as set forth in claim 1 further including further throttle valve means for controlling the speed of the engine.

3. An induction system as set forth in claim 2 wherein the further throttle valve means comprises a single throttle valve positioned in the atmospheric air inlet.

4. An induction system as set forth in claim 3 wherein the first mentioned throttle valve means is operated in response to an engine running condition.

5. An induction system as set forth in claim 4 wherein the engine running condition comprises engine load.

6. An induction system as set forth in claim 4 wherein the engine running condition comprises speed.

7. An induction system as set forth in claim 4 wherein the first and second intake passage means has a common portion.

8. An induction system as set forth in claim 7 wherein the plenum chambers are positioned on opposite sides of the engine.

9. An induction system as set forth in claim 8 wherein the engine has its cylinder bore inclined from the vertical.

10. An induction system as set forth in claim 1 wherein the first and second intake passage means has a common portion.

11. An induction system as set forth in claim 10 wherein the plenum chambers are positioned on opposite sides of the engine.

12. An induction system as set forth in claim 11 wherein the engine has its cylinder bore inclined from the vertical.

* * * * *